United States Patent [19]

Danescu

[11] 4,070,808
[45] Jan. 31, 1978

[54] ADJUSTABLE WALL STRUCTURE

[76] Inventor: Septimius Danescu, Webgasse 43/3/6, Vienna VI, Austria, A-1060

[21] Appl. No.: 708,694

[22] Filed: July 26, 1976

[30] Foreign Application Priority Data

Aug. 28, 1975 Austria .................................. 6655/75

[51] Int. Cl.$^2$ .......................... E04D 15/00; E04H 1/00
[52] U.S. Cl. ........................................ 52/122; 52/239; 52/281; 52/584
[58] Field of Search ...................... 52/281, 588, 70, 71, 52/242, DIG. 3, 726, 239, 758 D, 36, 65, 73, 281, 122, 594; 403/103, 83, 84

[56] References Cited

U.S. PATENT DOCUMENTS

| 3,119,473 | 1/1964 | Mitchell, Jr. ........................ 52/758 D |
| 3,127,962 | 4/1964 | James ...................................... 52/588 |
| 3,191,726 | 6/1965 | Pavlecka ............................... 52/758 D |
| 3,234,700 | 2/1966 | Creveling ........................... 52/DIG. 3 |
| 3,324,613 | 6/1967 | DuBoff ................................. 52/726 X |
| 3,529,392 | 9/1970 | Adams ................................. 52/726 X |
| 3,559,352 | 2/1971 | Magnuson .......................... 52/242 X |
| 3,710,525 | 1/1973 | Lopes ................................. 52/DIG. 3 |
| 3,732,653 | 5/1973 | Pickett ...................................... 52/71 |
| 3,797,184 | 3/1974 | Thompson ............................ 52/36 X |

Primary Examiner—Ernest R. Purser
Assistant Examiner—Robert C. Farber
Attorney, Agent, or Firm—Karl F. Ross

[57] ABSTRACT

A wall structure to be used as a partition, screen or the like comprises a plurality of panels with vertical edges attached to resilient profiles of the same or lesser height having strip portions which are substantially cylindrically curved over an arc of slightly more than 180°, these curved portions being peripherally interconvoluted about a common vertical axis forming the intersection of the vertical longitudinal midplanes of all the panels. The tubular hinge formed by the interconvoluted portions is immobilizable, in any relative angular position of the panels, by expandable plugs inserted into it from opposite ends.

10 Claims, 8 Drawing Figures

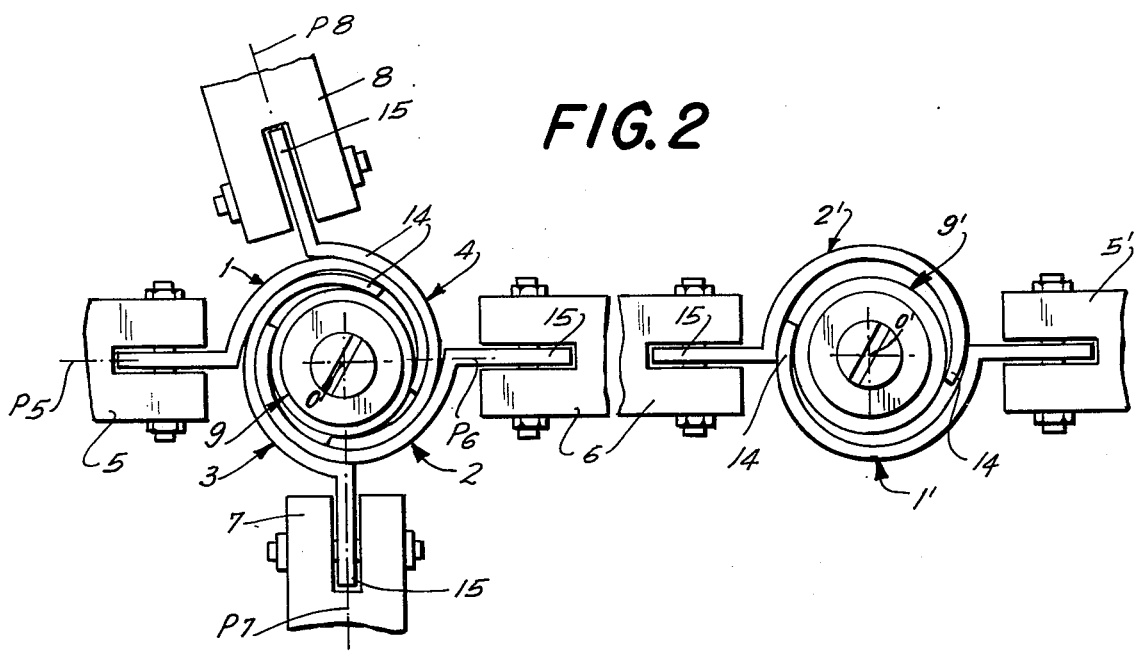
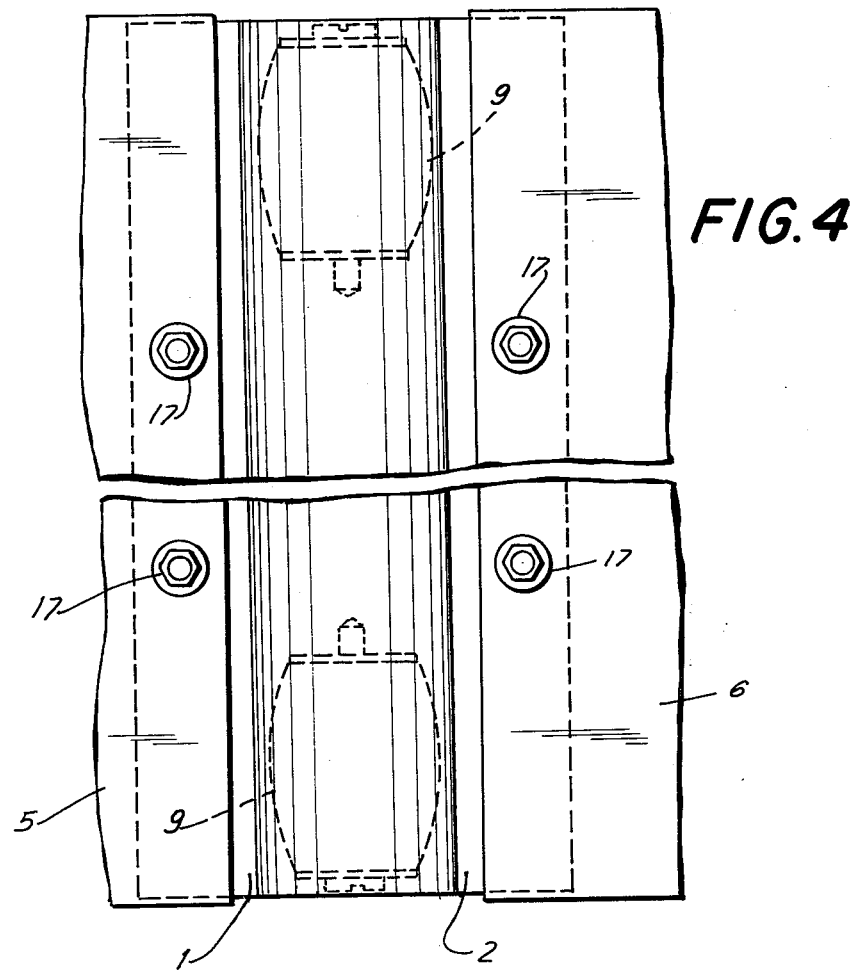

ADJUSTABLE WALL STRUCTURE

FIELD OF THE INVENTION

My present invention relates to an adjustable wall structure designed to be used as a partition, a screen, a room divider or the like.

BACKGROUND OF THE INVENTION

It has already been proposed to form such a wall structure from an upstanding bar of light metal provided with several longitudinal grooves into which respective panels will be fitted along their vertical edges to include different angles with one another. These angles are, of course, fixed by the profile of the grooved bar so that the adjustability of the structure is rather limited. Systems are also known in which the panels are interconnected by articulated arms leaving gaps therebetween; partitions constructed in this manner fail to afford privacy.

OBJECTS OF THE INVENTION

The general object of my present invention, therefore, is to provide an improved wall structure allowing the selective positioning of two or more panels at continuously adjustable angles to one another, without intervening gaps and with a wide swing range.

Another object is to provide means in such a structure for releasably maintaining the panels thereof in their selected relative position.

SUMMARY OF THE INVENTION

I realize these objects, in accordance with the present invention, by the provision of a plurality of resilient upright profiles of plastic or sheet metal (e.g. aluminum) which are secured to respective panels at vertical edges thereof and have resilient strip portions substantially cylindrically curved about a common vertical axis in peripherally interconvoluted relationship, thereby forming a tubular hinge which interconnects the panels with freedom of relative swinging about that axis. The panels can be relatively immobilized with the aid of clamp means engaging the tubular hinge, such as expandable plugs inserted into that hinge preferably from both ends.

In order to maintain the interconvoluted relationship of the cylindrically curved profile portions over a wide swing range, these portions should extend over an arc greater than 180°. Furthermore, so as to provide the necessary resiliency along with sufficient structural stability, I have found it desirable to let these curved portions decrease progressively in thickness toward their free edges, i.e. in a direction away from the associated panels.

A portable and self-supporting wall structure according to my invention may be provided with one or more bases threaded into or otherwise secured to its tubular hinge or hinges, advantageously through the intermediary of the associated clamping plug or plugs inserted into the lower hinge ends.

BRIEF DESCRIPTION OF THE DRAWING

The above and other features of my invention will now be described in detail with reference to the accompanying drawing in which:

FIG. 2 is a view similar to FIG. 1, showing a different panel position;

FIG. 4 is a partial side-elevational view of the wall structure shown in FIGS. 1 - 3;

SPECIFIC DESCRIPTION

Figure 1:
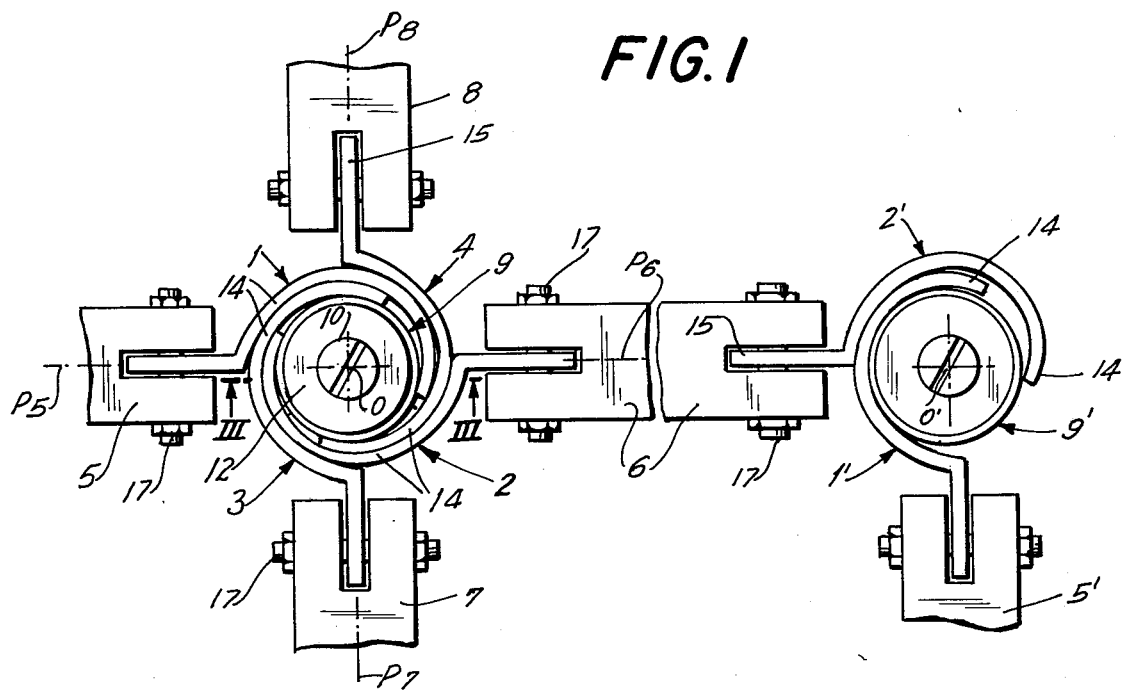
FIG. 1 is a top view of part of a wall structure according to my invention including several angularly adjustable panels.

In FIGS. 1 - 4 I have shown a wall structure comprising four upright profiles 1, 2, 3, 4 in the form of resilient strips each have a substantially cylindrically curved portion 14 and a straight portion or flange 15 angularly adjoining same. The flanges 15 are received in vertical median slots of respective panels 5, 6, 7, 8 to which they are secured by bolts 17 passing through aligned holes 16 in the panels and in the flanges. The panels, which have been illustrated only in part, are preferably of the same height as the axially coextensive profile strips (as seen in FIG. 4) but could also extend beyond them.

The curved profile portions 14, extending each over an arc of approximately 210° about a common axis O, are interconvoluted and therefore deformed into a generally spiral shape as seen in FIG. 2 axis O lies at the intersection of vertical longitudinal midplanes $P_5 - P_8$ of panels 5 - 8 in line with their respective flanges 15. Panel 6 is shown to form another hinge joint with a further panel 5', the latter being fastened to a profile 1' whose curved portion 14 is interconvoluted with that of a profile 2' secured to panel 6 at its vertical edge opposite the one carrying the profile 2. As will be apparent from FIGS. 1 and 2, panel 5' can swing relatively to panel 6 through an arc of about 180° with maintenance of the interconvoluted relationship of their profile portions 14 which are curved about an axis O'. Each of panels 5 - 8 can also swing through about 180° with reference to its neighbors, e.g. as illustrated for panel 8 in FIG. 2.

A radially expandable plug 9, centered on axis O, is inserted into the tubular hinge formed by the interconvoluted portions 14 of profiles 1 - 4 for the dual purpose of positively holding these portions in close face-to-face contact with one another and selectively immobilizing them in a desired relative angular position. A similar plug 9', centered on axis O', is provided for the hinge joint of panels 6 and 5'. As shown in FIG. 4, two such plugs may be inserted into each tubular hinge from below and from above.

Figure 3:
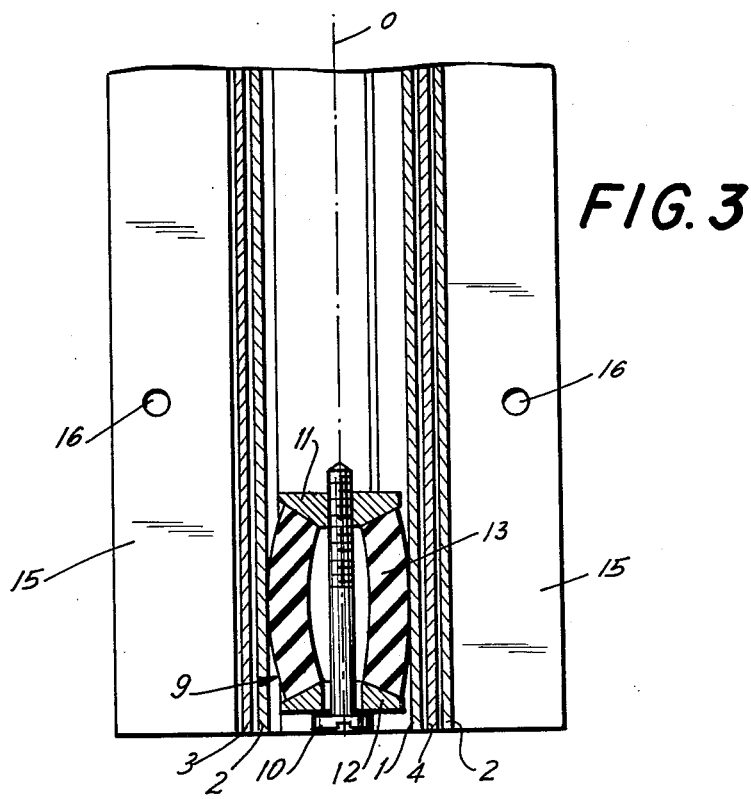
FIG. 3 is a fragmentary longitudinal sectional view taken on the line III — III of FIG. 1, with the panels omitted.

The construction of the plug 9 (and therefore also of plug 9') is best seen in FIG. 3 which shows it as comprising a tubular elastic body 13, of natural or synthetic rubber, clamped between two end disks 11 and 12. A bolt 10 passes freely through the lower disk 12 and is threaded into the upper disk 11 so that its rotation in a tightening sense axially compresses the plug body 13 and causes its radial expansion against the surrounding convolutions of profiles 1 - 4. The inner convolutions are thus pressed into firm contact with the outer ones so as to impede their relative rotation about axis O. The slotted head of bolt 10 lies next to the end of the tube so as to be readily accessible for purposes of adjustment. Plug 9 or 9' may be replaced by a plug 109 or 209 as described hereinafter with reference to FIGS. 5 – 8.

Figure 5:
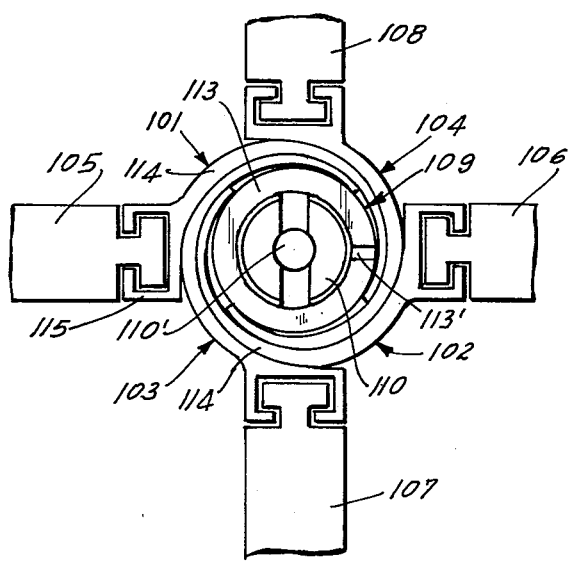
FIG. 5 is a top view similar to part of FIG. 1, illustrating another embodiment.

In FIG. 5 I have shown an assembly of four panels 105 – 108 secured to associated profiles 101 – 104 whose interconvoluted, substantially cylindrically curved portions 114 are generally similar to portions 14 of the profiles shown in FIGS. 1 – 4, except for the fact that these portions taper progressively toward their free edges to increase their stiffness near their junctions with the respective panels. These junctions are here formed by vertical channels 115 of C or U section whose arms terminate in inbent lips received in mating grooves of the panels. Naturally, the tapering of the curved profile portions can also be used if the profiles are provided with flat mounting flanges 15 as in the embodiment of FIGS. 1 – 4.

Figure 6:
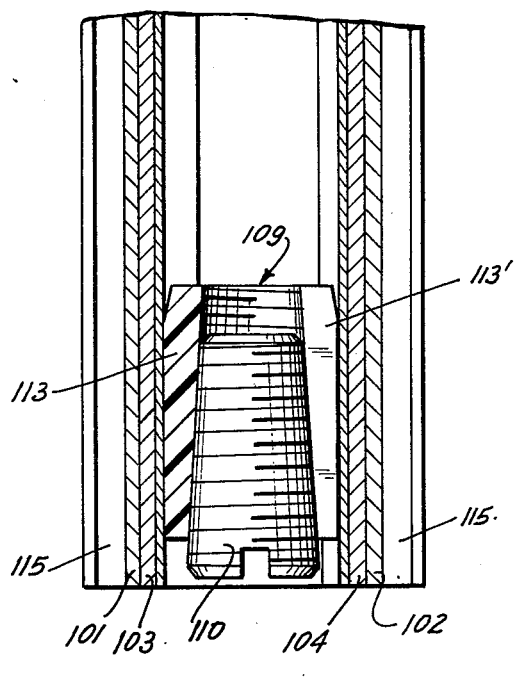
FIG. 6 is a cross-sectional view similar to FIG. 3, relating to the embodiment of FIG. 5.

The modified plug 109 shown in FIGS. 5 and 6 comprises an elastic body 113 of synthetic resin formed with a longitudinal slit 113', this body being internally threaded and engaged by a frustoconical screw 110 with a readily accessible slotted end. Rotation of screw 110 in a tightening sense expands the plug body 113 to fix the panels 105 – 108 in their chosen relative position as described above.

Figure 7:
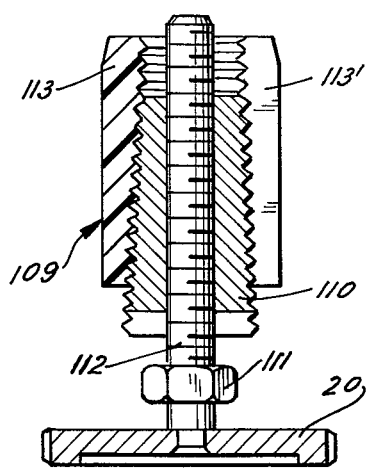
FIG. 7 is an axial sectional view of a modified expandable plug adapted to be used with either of the wall structures shown in the preceding Figures.

Screw 110 has a threaded central bore 110' into which, as shown in FIG. 7, a base 20 may be inserted with the aid of a complementarily threaded stem 112. The stem 112 and the nut 110 can be relatively immobilized with the aid of a nut 111.

Figure 8:
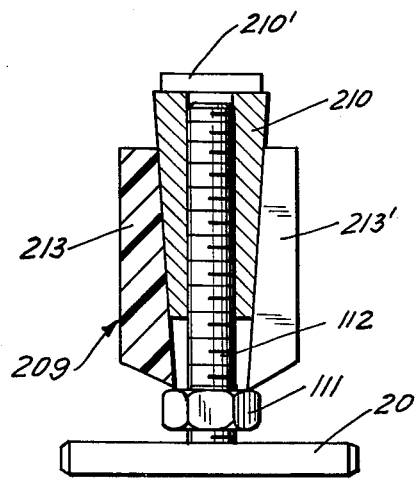
FIG. 8 is a view similar to FIG. 7, illustrating another form of expandable plug.

FIG. 8 shows an alternate way of attaching the base 20 to an expandable insert, i.e. the plug 209 whose body 213 differs from the body 113 of plug 109 by having no internal threads. A frustoconical core 210 is threadedly engaged by the stem 112 of base 20 and serves to expand the plug body 213 upon a rotation of nut 111 in a sense driving that plug body upwardly. Core 210 has a cross-brace 210' limiting the insertion of threaded stem 112.

Such a base 20 allows the wall structure according to my invention to stand freely on the floor or, if desired, to be secured to a suitable support. Although in many instances a single hinge joint with two or more panels radiating therefrom will suffice, FIGS. 1 and 2 make it apparent that the number of such joints can be increased at will.

I claim:
1. An adjustable wall structure comprising:
   a plurality of upright panels;
   a plurality of resilient upright profiles respectively secured to said panels at vertical edges thereof, said profiles having resilient strip portions substantially cylindrically curved about a common vertical axis in peripherally interconvoluted relationship, thereby forming a tubular hinge interconnecting said panels with freedom of relative swinging about said axis; and
   clamp means engaging said tubular hinge for relatively immobilizing said strip portions in face-to-face contact with one another.

2. A wall structure as defined in claim 1 wherein said curved strip portions extend each over an arc slightly greater than 180° about said axis.

3. A wall structure as defined in claim 1 wherein said curved strip portions progressively decrease in thickness away from said panels.

4. A wall structure as defined in claim 1 wherein said profiles include straight flanges angularly adjoining said curved strip portions and engaging the respective panels.

5. A wall structure as defined in claim 4 wherein said panels are provided along said vertical edges with vertical median slots receiving said flanges.

6. A wall structure as defined in claim 1 wherein said profiles include vertically channeled extensions of said curved strip portions engaging the respective panels.

7. A wall structure as defined in claim 1 wherein said panels have vertical longitudinal midplanes intersecting along said axis.

8. A wall structure as defined in claim 1 wherein said clamp means comprises at least one radially expandable plug inserted into said tubular hinge.

9. A wall structure as defined in claim 8 wherein said plug comprises an elastically deformable jacket and a screw-threaded core in said jacket accessible from an end of said tubular hinge for expanding said jacket.

10. A wall structure as defined in claim 8, further comprising a supporting base secured to said plug.

* * * * *